June 21, 1949. C. D. MacCRACKEN Re. 23,126

AIR COMPRESSOR

Original Filed Dec. 14, 1946 3 Sheets-Sheet 1

INVENTOR
CALVIN D. MACCRACKEN
BY
Williams, Rich & Maxee
ATTORNEYS

AIR COMPRESSOR

Original Filed Dec. 14, 1946 3 Sheets-Sheet 2

INVENTOR.
CALVIN D. MACCRACKEN
BY
Williams, Rich & Morse
ATTORNEYS

June 21, 1949. C. D. MacCRACKEN Re. 23,126

AIR COMPRESSOR

Original Filed Dec. 14, 1946 3 Sheets-Sheet 3

INVENTOR.
CALVIN D. MAC CRACKEN
BY
Williams, Rich & Morse
ATTORNEYS

Reissued June 21, 1949 Re. 23,126

UNITED STATES PATENT OFFICE 23,126

AIR COMPRESSOR

Calvin D. MacCracken, New Rochelle, N. Y., assignor, by direct and mesne assignments, to Jet-Heet, Inc., New York, N. Y., a corporation of New York Original No. 2,462,518, dated February 22, 1949, Serial No. 716,365, December 14, 1946, which is a continuation of Serial No. 678,627, June 22, 1946. Application for reissue April 8, 1949, Serial No. 86,251

2 Claims. (Cl. 230—127)

This invention relates to centrifugal compressors for supplying compressed air for any purpose, but particularly for a house-heating or air-conditioning system. The general object of the invention is to provide a centrifugal compressor which is simple and compact in construction and highly efficient in operation, and is capable of supplying compressed air for one, two or more purposes, for example, for supporting combustion in a fuel burner and also for furnishing the air to the house to be heated or air-conditioned.

This application is a continuation-in-part of my co-pending application Serial No. 678,627, filed June 22, 1946.

The air compressor[s] herein shown and described [are] is of a slow-speed and low compression type in which the rotor is about 16 inches in diameter and is intended to be driven at from about 1725 to 3450 revolutions per minute, and in which the compressed air is delivered at a pressure rise of about 3 to 12 inches of water; but of course the invention may be embodied in compressors in which the rotor is of larger or less diameter and is driven at much higher speeds, and which will deliver compressed air at higher pressures. Because of the relatively slow speed at which the rotor[s] [are] is driven in the compressor[s] herein shown and described, the parts of the rotor may be constructed principally of sheet metal; but in compressors in which the rotor is driven at much higher speeds the rotors may be otherwise constructed, for example, of steel or aluminum castings or forgings, in order to provide the necessary strength to resist the high centrifugal forces involved, and in such compressors the stator vanes may be of an air-foil type. In all cases, however, air compressors embodying the invention are characterized by a body portion having vanes so shrouded as to provide an air-intake opening near the shaft of the rotor and an annular air-outlet opening in the face of said rotor near its periphery; and in all cases there is provided a stator having fixed curved vanes which are circularly arranged in cooperative relation to said annular air-outlet opening and receive and change the direction and velocity of the compressed air delivered by the rotor through said annular opening, and direct said compressed air into two paths one of which is parallel to the axis of the rotor and the other of which is tranverse to and toward said axis.

Figure 1:
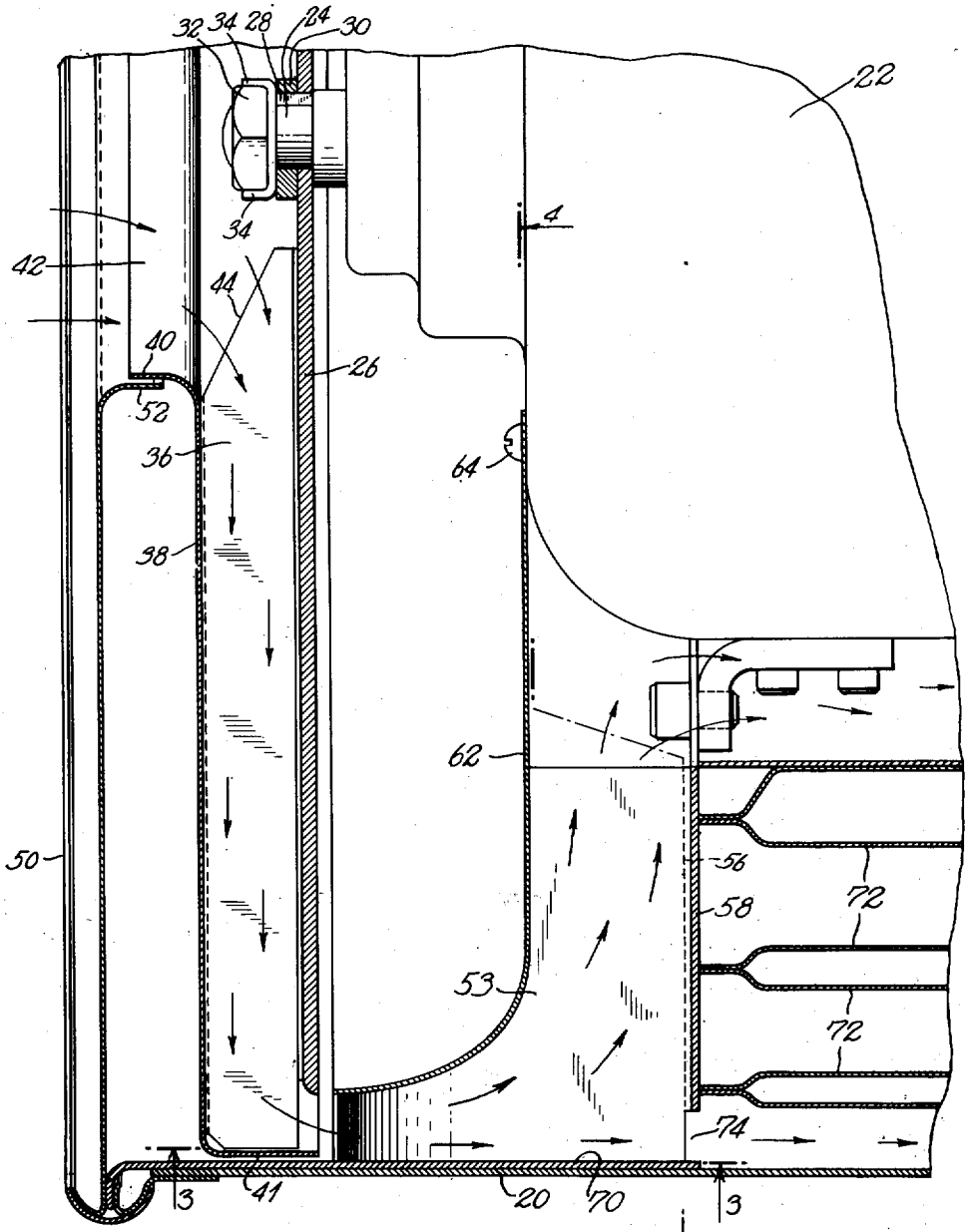
Figure 2:
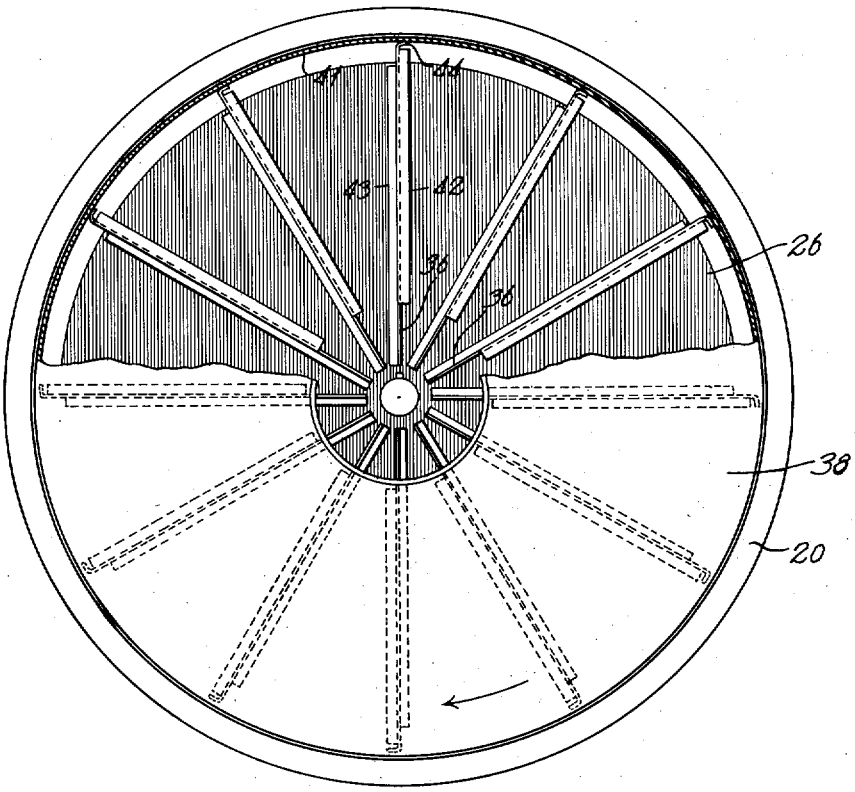
Figure 3:
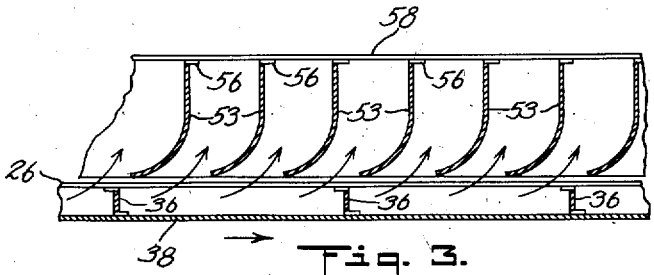
Figure 4:
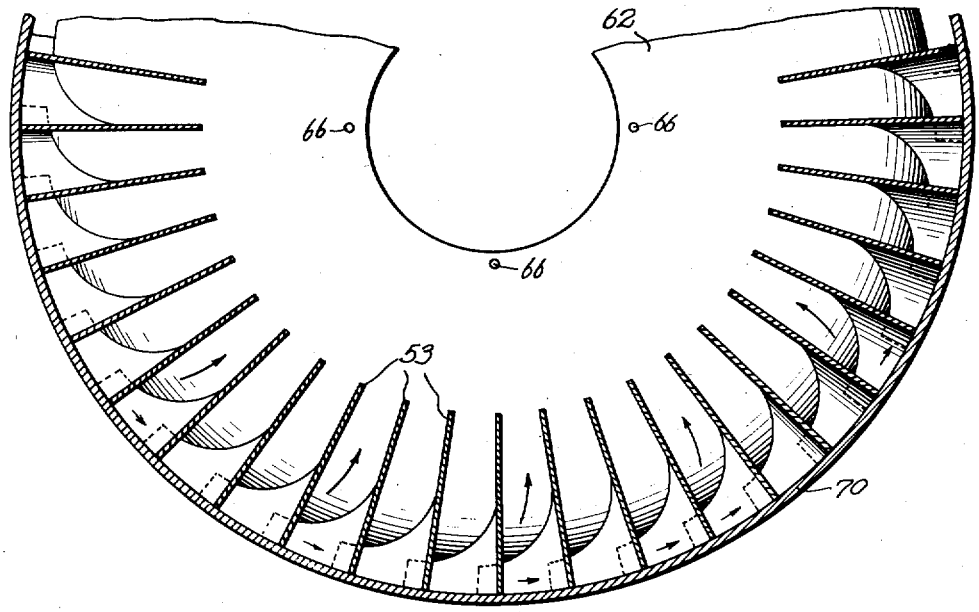
Figure 5:
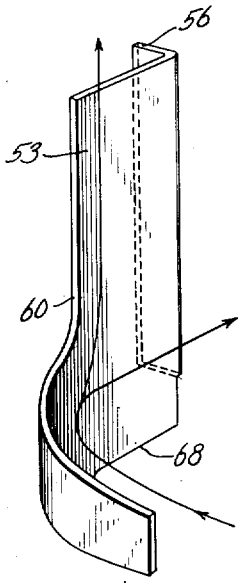

The invention will be understood from the following description taken in connection with the accompanying drawings in which a compressor embodying the invention is shown. In the drawings, Fig. 1 is a fragmentary sectional side elevation of a compressor embodying the invention as illustrated in said co-pending application; Fig. 2 is an elevation of the intake end of said compressor, with the end casing removed and a portion of the shroud of the rotor broken away; Fig. 3 is a fragmentary section on the line 3—3 of Fig. 1 looking in the direction of the arrows; Fig. 4 is a fragmentary sectional elevation on the line 4—4 of Fig. 1; and Fig. 5 is a perspective view of one of the fixed air deflectors, shown in Fig. 1, which direct the air after it leaves the rotor.

Referring to Fig. 1, the various parts of the air compressor are shown as arranged within a cylindrical casing 20 which also serves as the casing for the various parts of the heating apparatus shown in said co-pending application and partly illustrated at the right side of said figure. The rotor of the compressor is shown as driven by an electric motor 22 of any suitable type, but it will be understood that said rotor may be secured to a shaft that is driven by any suitable means. As shown, the rotor of the air compressor which is secured to the shaft 24 of the motor 22 comprises a body portion including a disc 26 mounted at its center on the shaft 24 and secured thereto by a key 28, a washer 30, and a nut 32 threaded on the end of said shaft 24 and locked against rotation by a lock plate having ears 34 that are bent into engagement with the nut 32 when the latter has been tightly set up. Secured to said disc 26 and radially arranged are vanes or blades 36 which project beyond the edge of the disc 26 as shown at the bottom of Fig. 1. A shroud 38, provided with a central air-intake opening surrounded by a lip 40, covers said vanes [30] 36 and is provided with a flanged edge 41 which surrounds the ends of said vanes 36 thereby providing an annular opening between said flanged edge 41 of said shroud 38 and the edge of said disc 26. As shown in Figs. 1, 2 and 3, the vanes 36 are bent over at their edges to provide flanges 42, 43 and 44 which are riveted or welded to the disc 26 and to the shroud 38, but other composite structures of these parts may be employed. As shown in Fig. 1, the vanes 36 are beveled as indicated at 44A. Secured to the end of the cylindrical casing 20 is an end casing 50 having a central opening surrounded by a lip 52 concentric with an adjacent to the lip 40 on the shroud 38, said end casing 50 being removably secured to the casing 20 by the construction shown or in any other suitable way.

The stator of the air compressor which receives air delivered by the rotor through the annular space between the edge of the disc 26 and the flange 41 of the shroud 38, will be understood from Figs. 1, [2], 3, 4 and 5. It will be apparent that the stator comprises stationary vanes 53, the shape of which will be evident from Fig. 5. Each of these vanes 53 is provided with a flange 56 which is welded or otherwise secured to an annular plate 58 having an outside diameter less than the diameter of the shell 70 (hereinafter mentioned) and located at a right angle to and concentric with the axis of the rotor[;], the radial arrangement of the vanes 53 being apparent from Fig. 4. Cooperating with the inner edges 60 of the vanes 53 is a cup-shaped shroud 62 (Fig. 1) having a central opening the margin of which cooperates with the casing of the motor 22 to which the shroud 62 is secured by screws 64 passing through holes 66 in said shroud 62. The outer edges 68 of the vanes 53 abut a cylindrical shell 70 which lies against the inside of the outer cylindrical casing 20. It will be apparent from Figs. 1, 4 and 5 how the vanes 53 of the stator receive the compressed air delivered by the rotor, change its direction and velocity, and direct it into the two paths indicated by the various arrows. One of these paths is parallel to the axis of the rotor and extends through the annular opening between the shell 70 and the outer edge of the plate 58; and the other of which is transverse to and towards said axis and extends between said shroud 62 and said plate 58. The stator vanes 53 shown in Figs. 1, 3, 4 and 5 are particularly suited to the use of the air compressor in connection with the air-heating device shown and described in said previously mentioned application, and partially shown at the right side of Fig. 1 where a part of a heat exchange device is shown as comprising a conduit 72 for hot gases spirally arranged within a casing into which a portion of the compressed air passes through the annular opening 74 between the edge of the plate 58 and the shell 70[;], while the rest of the compressed air is so directed by the vanes 53 that it passes around the motor 22 and on to the combustion chamber (not shown) of the heating device.

What is claimed is:

1. In a centrifugal air compressor, in combination with a rotor delivering compressed air through an annular opening in one face near its periphery, a stator receiving compressed air from said rotor and comprising a cylindrical sheet-metal shell concentrically located with reference to the axis of the rotor and having a diameter which is about equal to the outside diameter of the rotor, a plurality of curved sheet metal vanes located in cooperative relation to said annular opening in the rotor and radially arranged within said shell and with the outer edges of said vanes in contact with said shell, a sheet metal shroud in contact with the inner edges of said vanes, and an annular plate having an outside diameter less than the diameter of said shell and located at a right angle to and concentric with the axis of the rotor and in cooperative relation to the edges of said vanes; whereby the direction and velocity of the compressed air delivered by said rotor to the stator are changed and the compressed air is directed into two paths, one of which is parallel to the axis of the rotor and extends through the annular opening between said shell and the outer edge of said plate, and the other of which is transverse to and toward said axis and extends between said shroud and plate.

2. In a centrifugal air compressor, in combination with a rotor delivering compressed air through an annular opening in one face near its periphery, a stator receiving compressed air from said rotor and comprising a cylindrical shell concentrically located with reference to the axis of the rotor and having a diameter which is about equal to the outside diameter of the rotor, a plurality of curved vanes located in cooperative relation to said annular opening in the rotor and radially arranged within said shell and with the outer edges of said vanes in contact with said shell, a shroud in contact with the inner edges of said vanes, and an annular plate having an outside diameter less than the diameter of said shell and located at a right angle to and concentric with the axis of the rotor and in cooperative relation to the edges of said vanes; whereby the direction and velocity of the compressed air delivered by said rotor to the stator are changed and the compressed air is directed into two paths, one of which is parallel to the axis of the rotor and extends through the annular opening between said shell and the outer edge of said plate, and the other of which is transverse to and toward said axis and extends between said shroud and plate.

CALVIN D. MacCRACKEN.

No references cited.